United States Patent [19]
Ozawa

[11] Patent Number: 5,265,153
[45] Date of Patent: Nov. 23, 1993

[54] FACSIMILE COMMUNICATION SYSTEM WITH COMMUNICATION CHARGE CALCULATION

[75] Inventor: Masatoshi Ozawa, Atsugi, Japan

[73] Assignee: Matsushita Graphic Communications System, Inc., Japan

[21] Appl. No.: 756,679

[22] Filed: Sep. 9, 1991

[30] Foreign Application Priority Data

Sep. 18, 1990 [JP] Japan .................. 2-249445

[51] Int. Cl.$^5$ .............. H04M 11/00; H04M 15/00; H04M 15/12; H04N 1/32
[52] U.S. Cl. ........................... 379/100; 379/88; 379/114; 379/119; 358/401; 358/442
[58] Field of Search ............ 379/100, 96, 97, 98, 379/93, 94, 130, 131, 132, 119, 121, 122, 123; 358/442, 443, 401, 402

[56] References Cited

U.S. PATENT DOCUMENTS

| | | | |
|---|---|---|---|
| 4,275,272 | 6/1981 | Mennino, Jr. et al. | 379/122 |
| 4,868,758 | 9/1989 | Kokubu | 379/100 |
| 4,891,836 | 1/1990 | Takahashi | 379/132 |
| 4,920,562 | 4/1990 | Hird et al. | 379/132 |
| 4,956,721 | 9/1990 | Tasaki et al. | 379/100 |
| 4,967,288 | 10/1990 | Mizutori et al. | |
| 4,994,926 | 2/1991 | Gordon et al. | 379/100 |
| 5,014,300 | 5/1991 | Harvath et al. | 379/100 |

FOREIGN PATENT DOCUMENTS

| | | | |
|---|---|---|---|
| 63-274265 | 11/1988 | Japan | |
| 64-85449 | 3/1989 | Japan | |
| 1-226249 | 9/1989 | Japan | |
| 0254848 | 10/1990 | Japan | 379/100 |
| 0026163 | 2/1991 | Japan | 379/100 |

Primary Examiner—Jin F. Ng
Assistant Examiner—Stella L. Woo
Attorney, Agent, or Firm—Lowe, Price, LeBlanc & Becker

[57] ABSTRACT

A telephone network connects a facsimile terminal and a store device. A terminal adaptor is connected between the facsimile terminal and the telephone network. A voice response unit is connected between the telephone network and the store device. A control device is connected to the voice response unit and the store device. The terminal adaptor enables the facsimile terminal to gain access to the telephone network and the voice response unit, and to inquire a communication charge on the facsimile terminal of the control device. The voice response unit mediates a communication among the facsimile terminal, the terminal adaptor, the store device, and the control device, to transmit an instruction from the control device to the facsimile terminal as a voice response, to connect the facsimile terminal and the store device when an answer of the facsimile terminal to the voice response satisfies a predetermined condition, and to break the connection between the facsimile terminal and the store device after a facsimile communication is completed. The store device serves to store information transmitted from at least one of the facsimile terminal and the control device. The control device serves to store and manage the information stored in the store device on the basis of a number specified with respect to the information, to transmit the stored information to the store device in compliance with a readout requirement from the facsimile terminal, to calculate the communication charge, and to control a communication with the store device and the voice response unit.

24 Claims, 13 Drawing Sheets

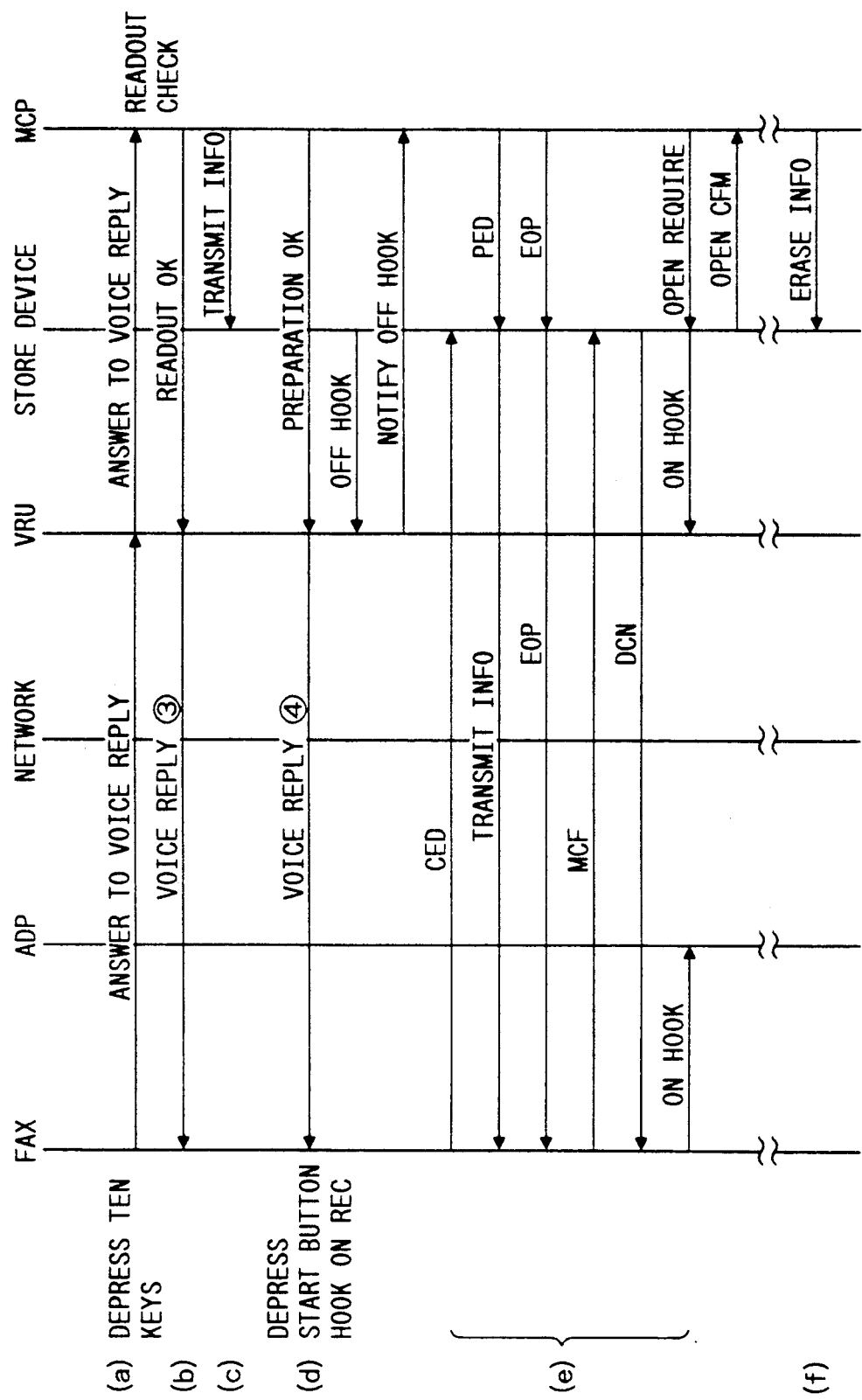

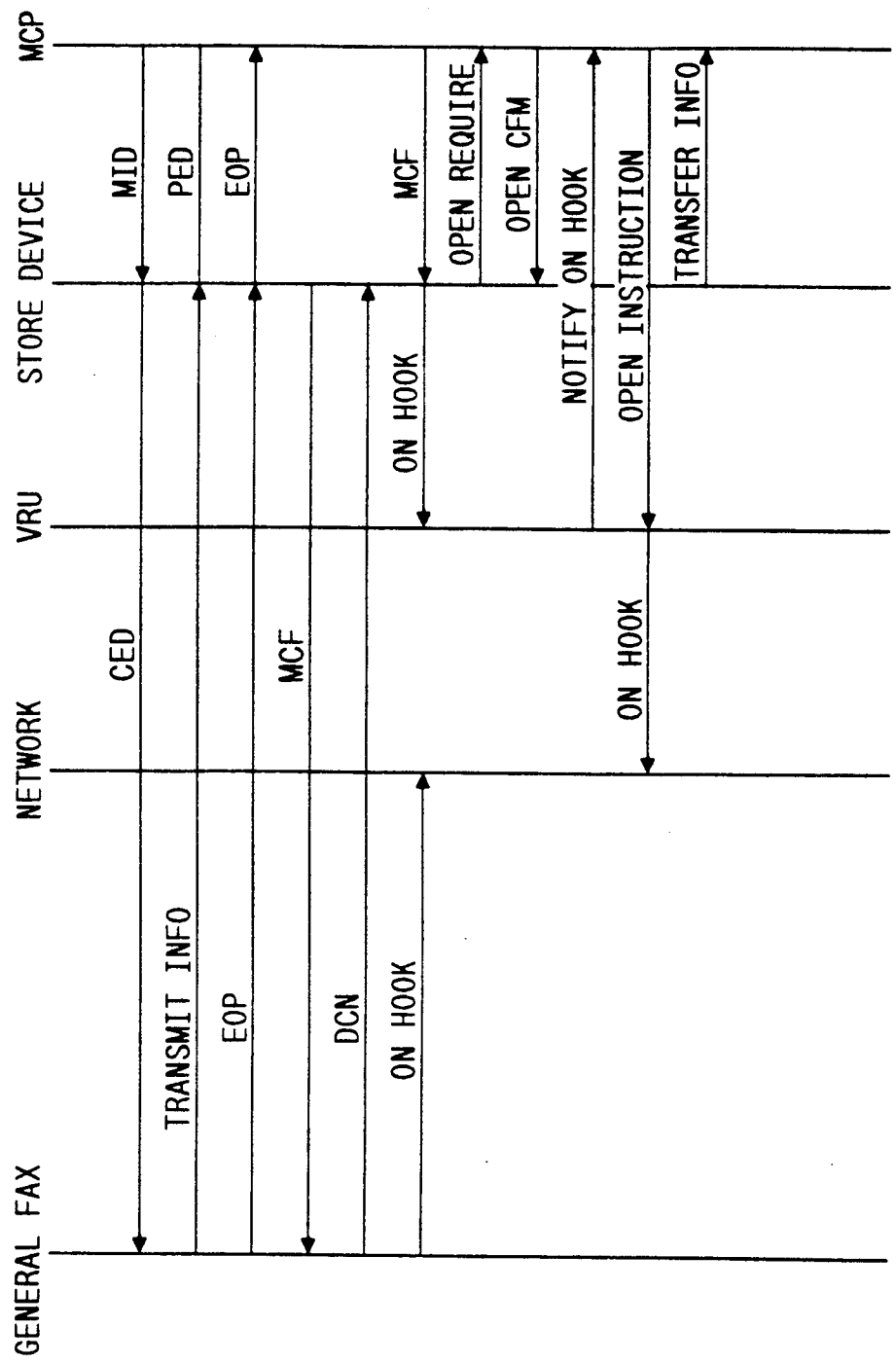

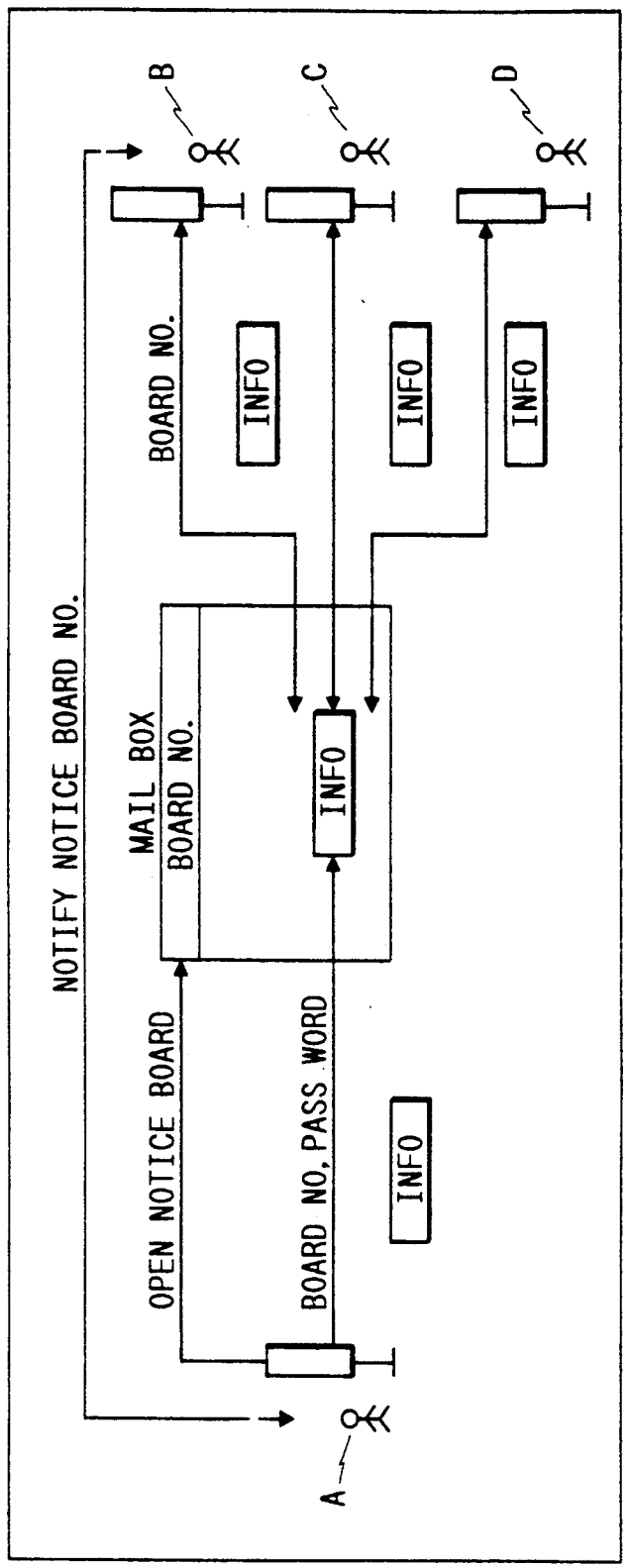

FACSIMILE COMMUNICATION SYSTEM WITH COMMUNICATION CHARGE CALCULATION

BACKGROUND OF THE INVENTION

1. Field of the Invention

This invention relates to a facsimile communication system in which facsimile terminals are connected via a telephone network. This invention specifically relates to a facsimile communication network system in which a central station including a picture store device serves to store picture information transmitted from facsimile terminals and to read out the stored picture information, and terminal adaptors indicate related communication charges.

2. Description of the Prior Art

In recent years, facsimile systems have been increasingly used, and large facsimile networks have been constructed. Some of facsimile networks include facsimile terminals and a facsimile store and conversion apparatus connected via telephone lines. Such facsimile networks are used in various ways. One example is a simultaneous multi-address transmission in which one facsimile terminal transmits common picture information to other facsimile terminals at a designated time. Another example is a mail box communication in which one facsimile terminal registers picture information into a store and conversion apparatus by using a predetermined ID (identification) number, and another facsimile terminal picks up registered picture information designated by the same ID number.

In a facsimile communication network system including facsimile terminals used by fixed subscribers, charges are monthly paid by the subscribers. In a facsimile communication network system including facsimile terminals used by unspecified persons, each user pays a charge for the related communication.

Japanese published unexamined patent application 1-226249 discloses a facsimile communication network system in which users pre-buy membership cards, and a user inserts his membership card into a facsimile terminal when using the facsimile terminal. Each membership card specifies a usable communication rate number, which is decremented each time the membership card is used to execute facsimile communication. The usable communication rate number is also decreased as the communication continues. In this prior art system, a user feels inconvenience when a usable communication rate number in his membership card is small but a large amount of picture information to be transmitted is present.

SUMMARY OF THE INVENTION

It is an object of this invention to provide an improved facsimile communication system.

A first aspect of this invention provides a facsimile communication system comprising a facsimile terminal; a store device; a telephone network connecting the facsimile terminal and the store device; a terminal adaptor connected between the facsimile terminal and the telephone network; a voice response unit connected between the telephone network and the store device; and a control device connected to the voice response unit and the store device; the terminal adaptor including means for enabling the facsimile terminal to gain access to the telephone network and the voice response unit, means for inquiring a communication charge on the facsimile terminal of the control device, and means for recording an answer to said inquiring; the voice response unit including means for mediating a communication among the facsimile terminal, the terminal adaptor, the store device, and the control device, means for transmitting an instruction from the control device to the facsimile terminal as a voice response, means for connecting a line between the facsimile terminal and the store device when an answer of the facsimile terminal to the voice response satisfies a predetermined condition, and means for breaking the connection between the facsimile terminal and the store device after a facsimile communication is completed; the store device including means for storing information transmitted from at least one of the facsimile terminal and the control device; the control device including means for storing and managing the information stored in the store device on the basis of a number specified with respect to the information, means for transmitting the stored information to the store device in compliance with a requirement for reading out the information which is outputted from the facsimile terminal, means for calculating the communication charge, and means for controlling a communication with the store device and the voice response unit.

A second aspect of this invention provides a facsimile communication system comprising a facsimile terminal; a picture store control device; a telephone network connecting the facsimile terminal and the picture store control device; and a terminal adaptor connected between the facsimile terminal and the telephone network; the terminal adaptor including means for enabling the facsimile terminal to gain access to the telephone network and the picture store control device, means for inquiring a communication charge on the facsimile terminal of the picture store control device, and means for obtaining an answer to said inquiring and indicating the communication charge; the picture store control device including means for outputting the stored information in compliance with a requirement for reading out the information which is transmitted from the facsimile terminal, means for giving a voice guidance to the facsimile terminal necessary in the process, and means for calculating the communication charge in compliance with a requirement from the terminal adaptor.

BRIEF DESCRIPTION OF THE DRAWINGS

FIG. 7 is a diagram showing a communication sequence which occurs in the case where registered information is read out by a facsimile terminal.

FIG. 8A and FIG. 8B are a diagram showing a communication sequence which occurs in the case where information is registered from a general facsimile terminal.

FIG. 11 is a diagram of a notice board in another modification of the embodiment of this invention.

DESCRIPTION OF THE PREFERRED EMBODIMENT

Figure 1:
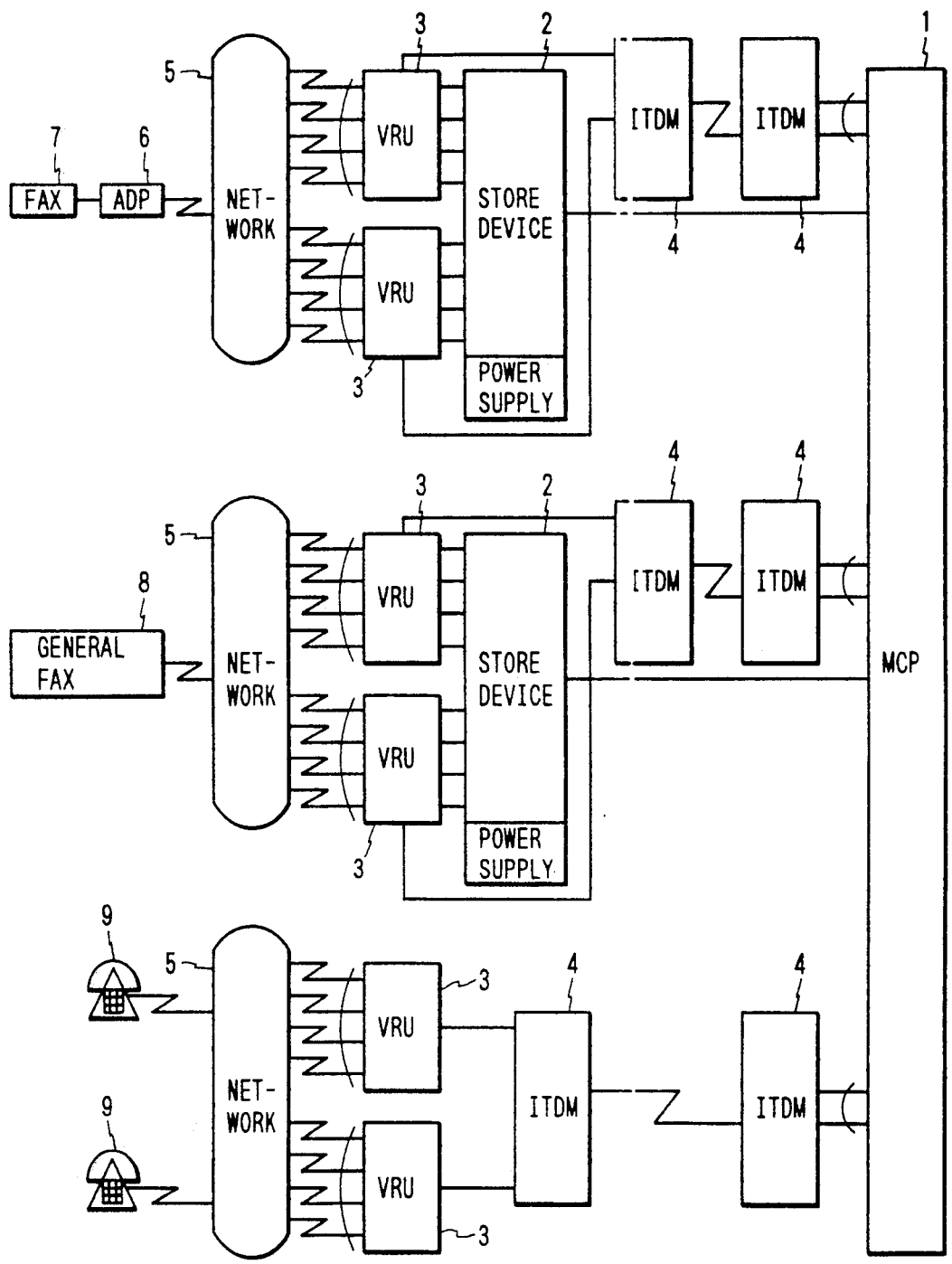
FIG. 1 is a block diagram of a facsimile communication system according to an embodiment of this invention.

FIG. 1 shows the structure of a facsimile communication system according to an embodiment of this invention. With reference to FIG. 1, a main control processor (MCP) 1 serves to store picture information, calculate charges, totalize charges, and totalize statistical information. Store devices 2 function as facsimile servers. Specifically, each store device 2 serves to store picture information transmitted from facsimile terminals and the MCP 1. In addition, each store device 2 has the function of recognizing a signal representative of a PB tone (a tone of a push-button-type telephone device). Furthermore, each store device 2 serves to store picture information transmitted from a facsimile terminal in compliance with an instruction from the MCP 1, and to transmit stored picture information to a desired facsimile terminal. Voice response units (VRUs) 3 serve to recognize information of various instructions from a facsimile terminal to the MCP 1, and to notify the MCP 1 of the recognized instruction information. In addition, each VRU 3 serves to convert an instruction from the MCP 1 into a signal of a PB tone and transmit the PB tone signal to a facsimile terminal, and to generate voice instructions to a facsimile operator. In addition, each VRU 3 serves to control the establishment and the break of the connection between a store device 2 and a facsimile terminal. Some of the VRUs 3 are connected to the store devices 2. Intelligence time division multiplexers (ITDMs) 4 serve as intelligent modulator-demodulators (MODEMs). The ITDMs 4 are combined into pairs each connected between the VRUs 3 and MCP 1. A public telephone network 5 is connected to the VRUs 3. A facsimile terminal (FAX) 7 is connected to the public telephone network 5 via a terminal adaptor (ADP) 6. The ADP 6 has a dialing function for enabling the FAX 7 to gain access to the telephone network 5 and the VRUs 3. The ADP 6 is notified by the MCP 1 of a charge for the communication of the FAX 7, and prints out the charge. A general facsimile terminal (general FAX) 8 is directly connected to the telephone network 5. The general FAX 8 can communicate with the VRUs 3 via the telephone network 5. Push-button-type telephone devices (PB telephone devices) 9 can communicate with the VRUs 3 via the telephone network 5. The ADP 6, the FAX 7, and the general FAX 8 are referred to as FAX terminals.

Figure 2:
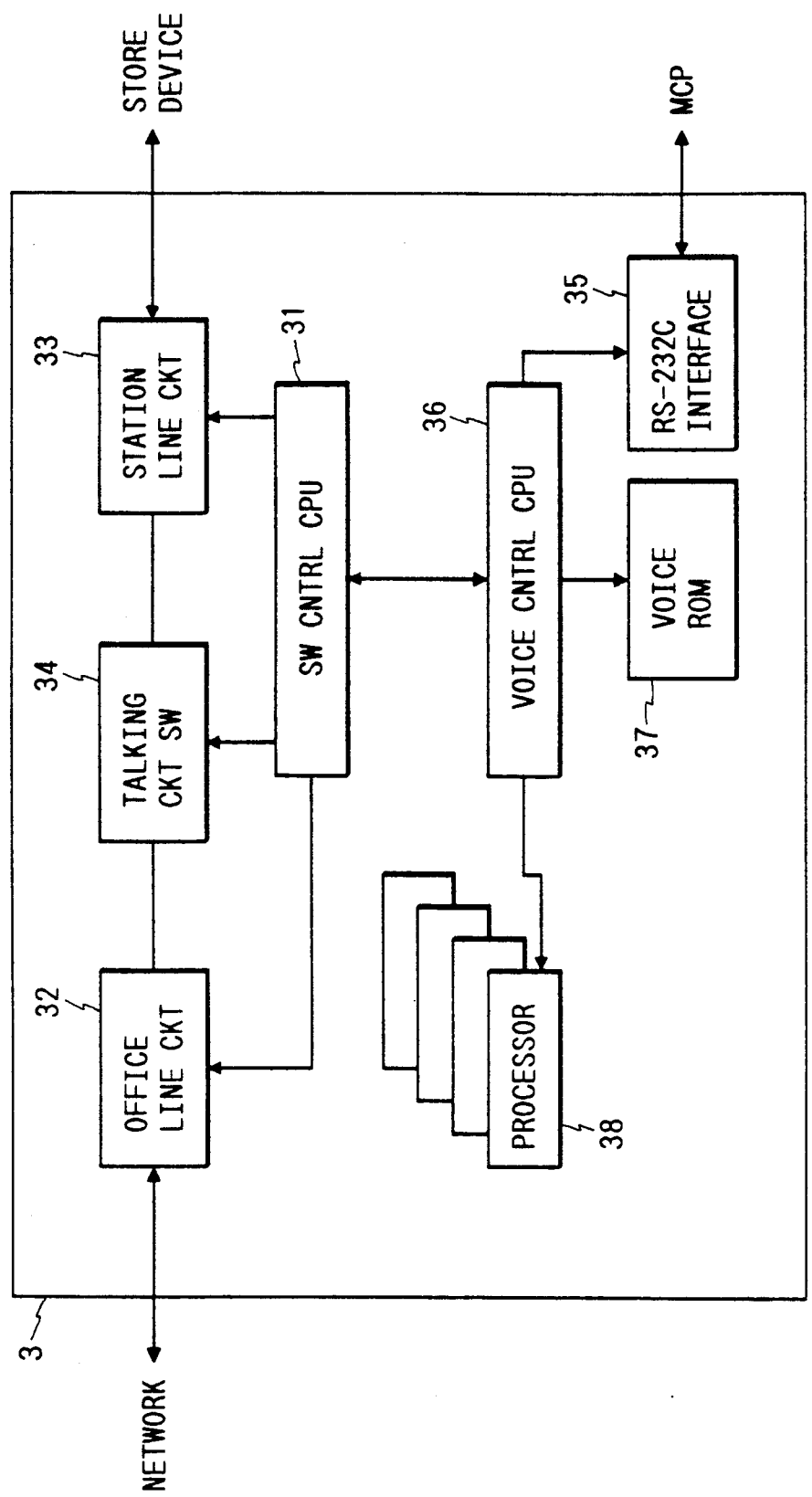
FIG. 2 is a block diagram of a voice response unit in the system of FIG. 1.

FIG. 2 shows the structure of each voice response unit (VRU) 3 in FIG. 1. With reference to FIG. 2, the VRU 3 includes a communication management section and a voice response section controlled by a switching control CPU 31 and a voice control CPU 36 respectively. The communication management section of the VRU 3 includes an office line circuit 32 connected to the telephone network 5, a station line circuit 33 connected to the store device 2, a talking circuit switch 34 connecting and disconnecting the office line circuit 32 and the station line circuit 33 to and from each other, and an RS-232C interface 35 connected to the MCP 1.

The voice response section of the VRU 3 includes a voice response ROM 37 and a voice and PB tone processor 38. The voice response ROM 37 stores information representing predetermined voices. The voice response section serves to transmit information of a voice from the voice response ROM 37 to the FAX 7, the general FAX 8, or the PB telephone device 9 via the office line circuit 32 and the telephone network 5 in compliance with an instruction fed from the MCP 1 via the RS-232C interface 35. A PB tone is used in the communication with the FAX 7. The PB tone is a signal represented by codes corresponding to the numerals 0-9 and the characters #, *, and A-D. On the other hand, ASCII codes are used in the communication with the MCP 1. The voice and PB tone processor 38 executes the conversion between the PB tone signal and the ASCII codes. The voice and PB tone processor 38 has sections for four lines.

The VRU 3 also executes the following processes. While using a fixed timer value as a reference, the VRU 3 monitors intervals of respective segments of a PB tone signal transmitted from the FAX 7 after the transmission of a voice guidance. When a subsequent PB tone segment is not detected in the timer value, the VRU 3 notifies the MCP 1 of an error and then obeys an instruction from the MCP 1. The timer value can be arbitrarily set to a suitable value. In the case where the communication with the MCP 1 is blocked due to causes such as a break of the line between the VRU 3 and the MCP 1, or in the case where it is difficult to execute normal processing responsive to an instruction from the MCP 1, the VRU 3 outputs a message representing that this communication system can not be used now. When the VRU 3 is required by a FAX terminal to read out registered information, the VRU 3 prepares and transmits the registered information. During the preparation of the registered information, the VRU 3 transmits a signal representative of a music to the FAX terminal. The VRU 3 automatically stops the transmission of the music signal when receiving a next command from the MCP 1.

Figure 3:
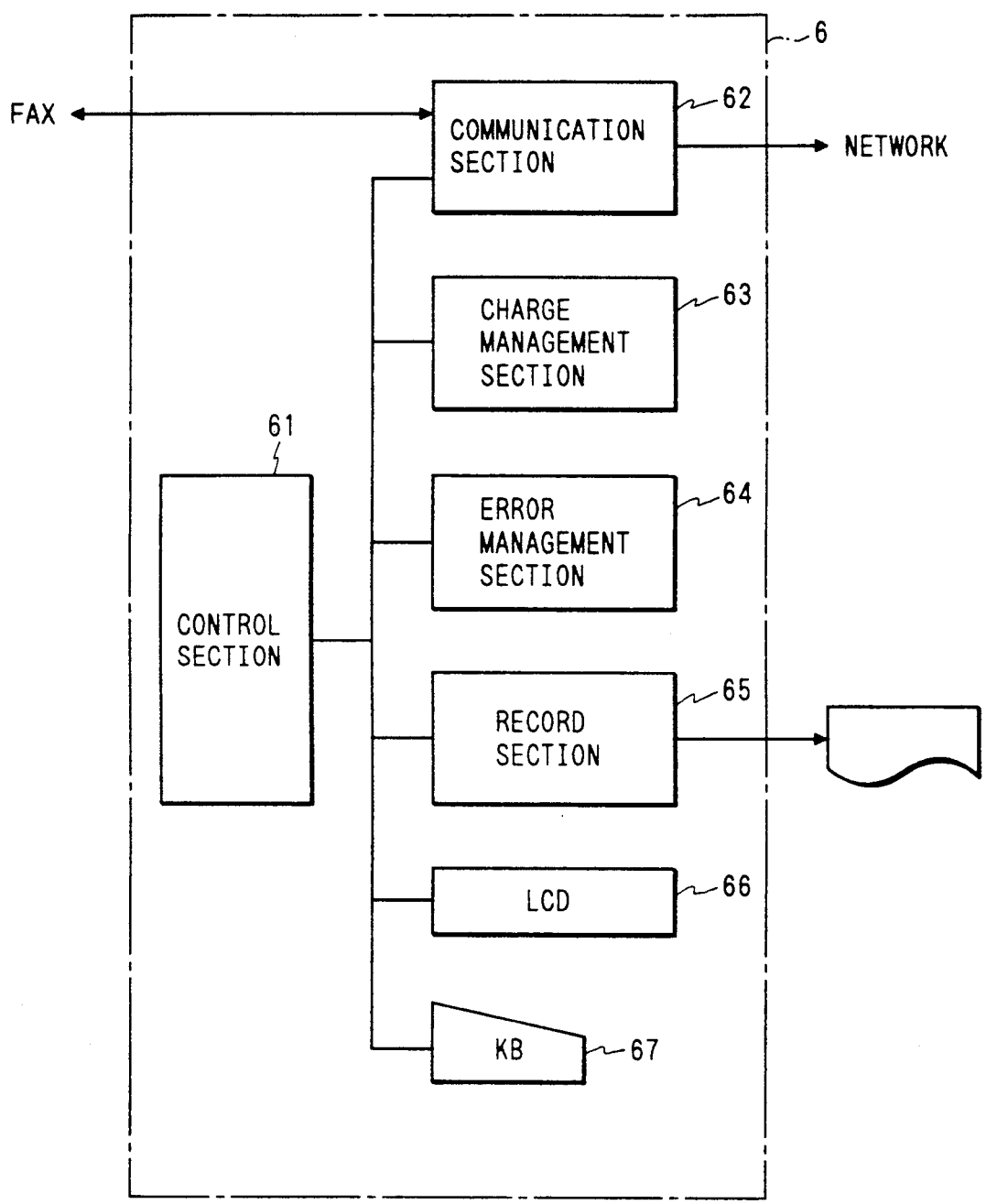
FIG. 3 is a block diagram of a terminal adaptor in the system of FIG. 1.
Figure 4:
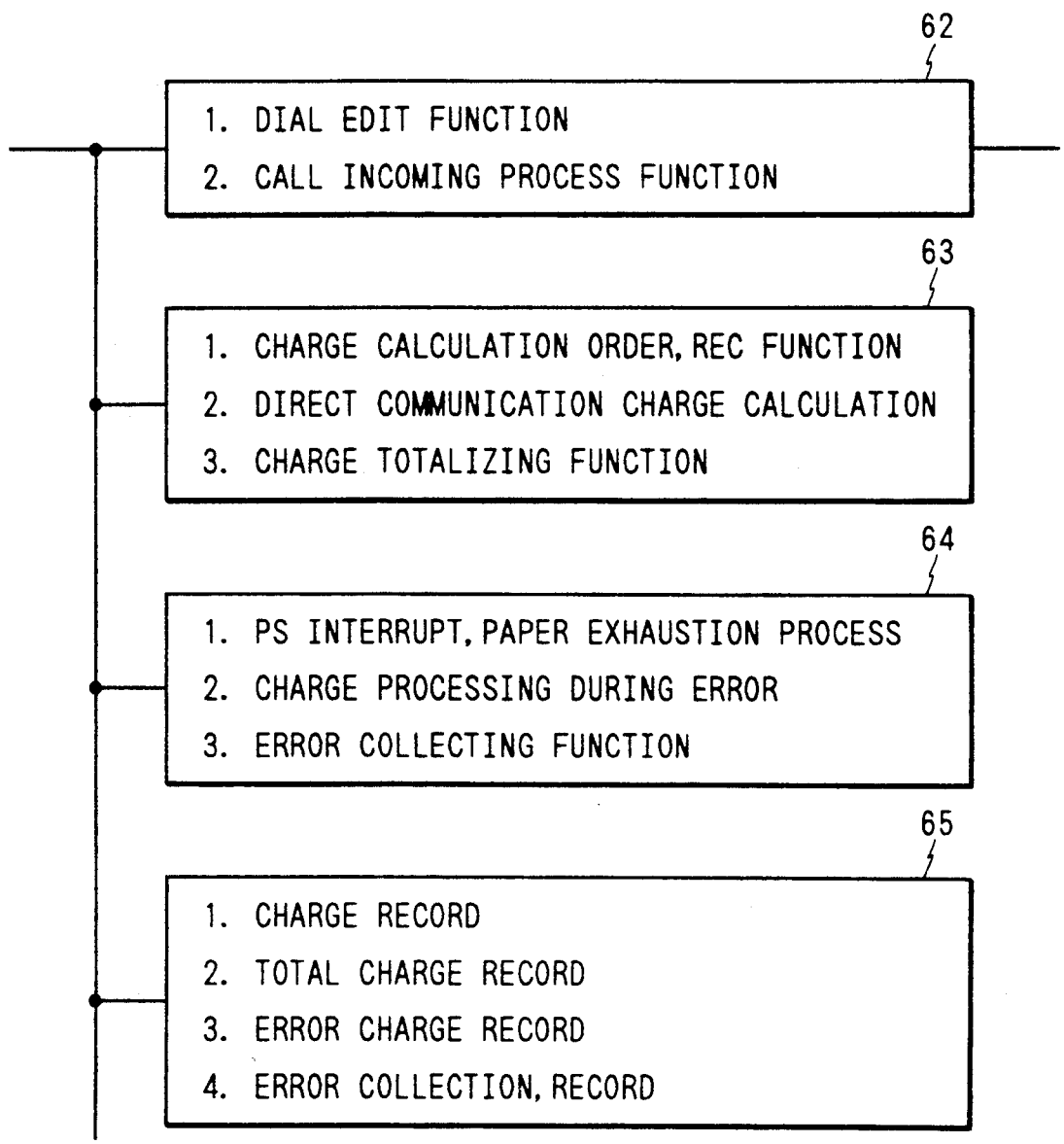
FIG. 4 is a diagram of sections of the terminal adaptor in FIG. 3.

FIG. 3 shows the structure of a terminal adaptor (ADP) 6. FIG. 4 shows the details of some sections of the ADP 6. As shown in FIG. 3, the ADP 6 includes a combination of a controller 61, a communication section 62, a charge management section 63, an error management section 64, a record section 65, a liquid crystal display (LCD) 66, and a keyboard (KB) 67. The sections 62-67 are controlled by the controller 61.

As shown in FIG. 4, the communication section 62 is connected between the FAX 7 and the telephone network 5. The communication section 62 has a dial editing function and a call-incoming processing function. According to the contents of a dial signal transmitted from the FAX 7, the dial editing process executes the following dial operating steps.

① Registering information transmitted to the store device 2, and reading out information from the store device 2.

② Controlling a dial transmission.

③ Transmitting an ID (identification) code of the FAX 7.

④ Executing direct communication in which the FAX 7 directly communicates with another FAX 7 or the general FAX 8.

A body of the ADP 6 has a FAX use starting button. When this button is depressed, the ADP 6 connects the line between the FAX 7 and the ADP 6. According to the call-incoming processing function, the ADP 6 moves into a through state in response to a call incoming from the telephone network 5, and does not execute any process on the call incoming. It should be noted that the ADP 6 ignores the call incoming when being in use or when being not supplied with power.

As shown in FIG. 4, the charge management section 63 has the function of requesting the MCP 1 to calculate a charge and receiving the result of the charge calculation, the function of calculating a direct-communication charge, and the function of totalizing changes. After the FAX 7 registers transmitted information into the store device 2 or after the FAX 7 reads out registered information from the store device 2, the charge management section 63 requests the MCP 1 to calculate a related charge via the VRU 3 and then receives the calculated charge and the used time from the MCP 1. Subsequently, the charge management section 63 enables the calculated charge to be indicated on the LCD 66, and enables a statement of accounts of the calculated charge and the used time to be printed out from the record section 65. In the case of direct communication of the FAX 7 with another FAX 7 or the general FAX 8, after the acceptance of a direct communication command, the charge management section 63 monitors the communication time and calculates a related charge. Then, the charge management section 63 enables the calculated charge to be indicated on the LCD 66, and enables a statement of accounts of the calculated charge and the final communication time to be printed out from the record section 65. In addition, the charge management section 63 has the function of totalizing charges during a predetermined interval, for example, predetermined hours, one day, or one month. The charge management section 63 enables the result of the charge totalization to be printed out from the record section 65, and enables the result of the charge totalization to be transmitted to the MCP 1. Printing out the charge includes numerical expression of the charge and also bar-code expression of the charge. In general, the bar code includes information representing the location of the FAX 7, information representing FAX communication, and information representing a communication charge. Thereby, in the case where the FAX 7 is placed in a supermarket, a FAX charge and prices of other bought goods can be simultaneously totalized by a single bar-code reader.

As shown in FIG. 4, the error management section 64 has the function of processes for power supply interruption and recording-paper exhaustion, the function of processing information of a charge upon a communication error, and the function of collecting errors. When a power supply is interrupted due to a power failure or a disconnection of a plug from an ac power line, the error management section 64 uncouples the FAX 7 from the telephone network 5. When the error management section 64 detects that recording papers are exhausted in the recording section 65, the error management section 64 also uncouples the FAX 7 from the telephone network 5. When the error management section 64 recognizes an error command represented by a PB tone signal notified by the VRU 3, the error management section 64 outputs an error report. In the case where an error command is not received but a malfunction ends, or in the case where a telephone receiver is hooked on in the FAX 7 at an intermediate stage of a communication sequence, the error management section 64 outputs an error report. During direct communication, when a communication error occurs, the error management section 64 outputs an error report and nullifies a charge. The error reports are collected for a predetermined period, and are printed out from the recording section 65.

Returning to FIG. 3, an instruction of printing out a charge during a predetermined period can be inputted via the keyboard 67.

Figure 5:
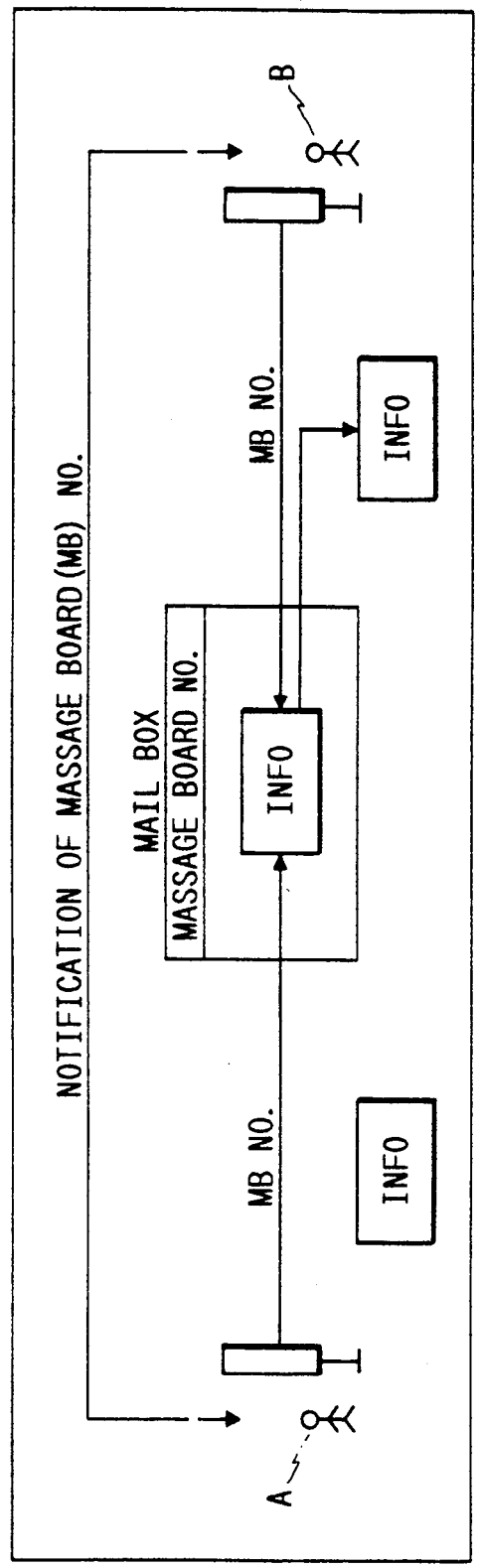
FIG. 5 is a diagram of a massage board in the embodiment of this invention.

FIG. 5 shows a massage board in the embodiment of this invention. With reference to FIG. 5, the users A and B previously know a message board number (a message board NO.), and one of them registers message information into the massage board. The other user reads out the registered massage information on the basis of the massage board NO. During this period, the following process is good. Before reading out the message information, the other user checks whether or not a message related to the message board NO. is registered by using the PB telephone device 9. Both the users must pay charges. The period during which message information is registered in the MCP 1 is predetermined. When this registration period expires, the message information is erased. Accordingly, when an inquiry is done via the PB telephone device 9, it is generally necessary to confirm the registration date and the readout due date.

Figure 6A:
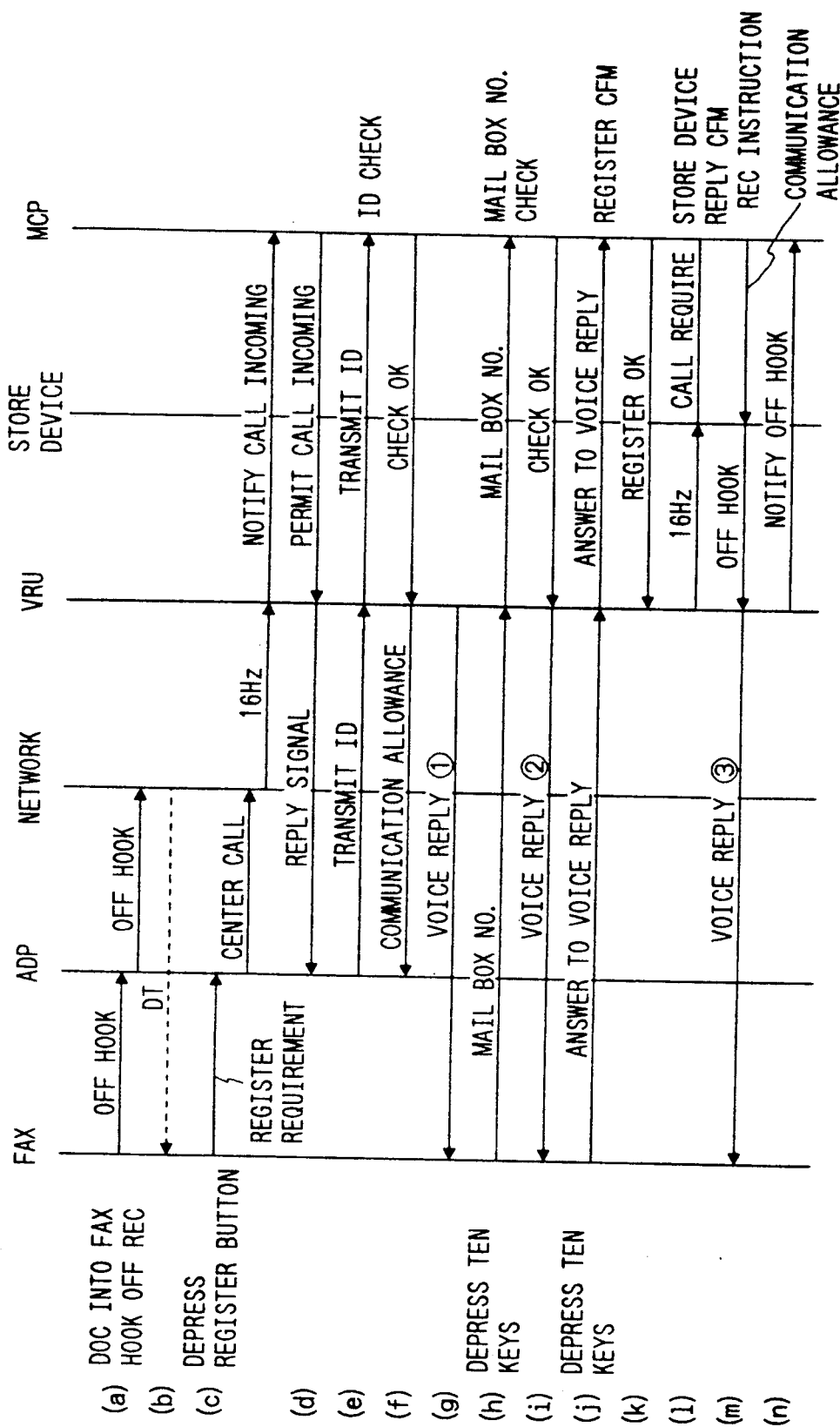
FIG. 6A and FIG. 6B are a diagram showing a communication sequence which occurs in the case where information is registered from a facsimile terminal.
Figure 6B:
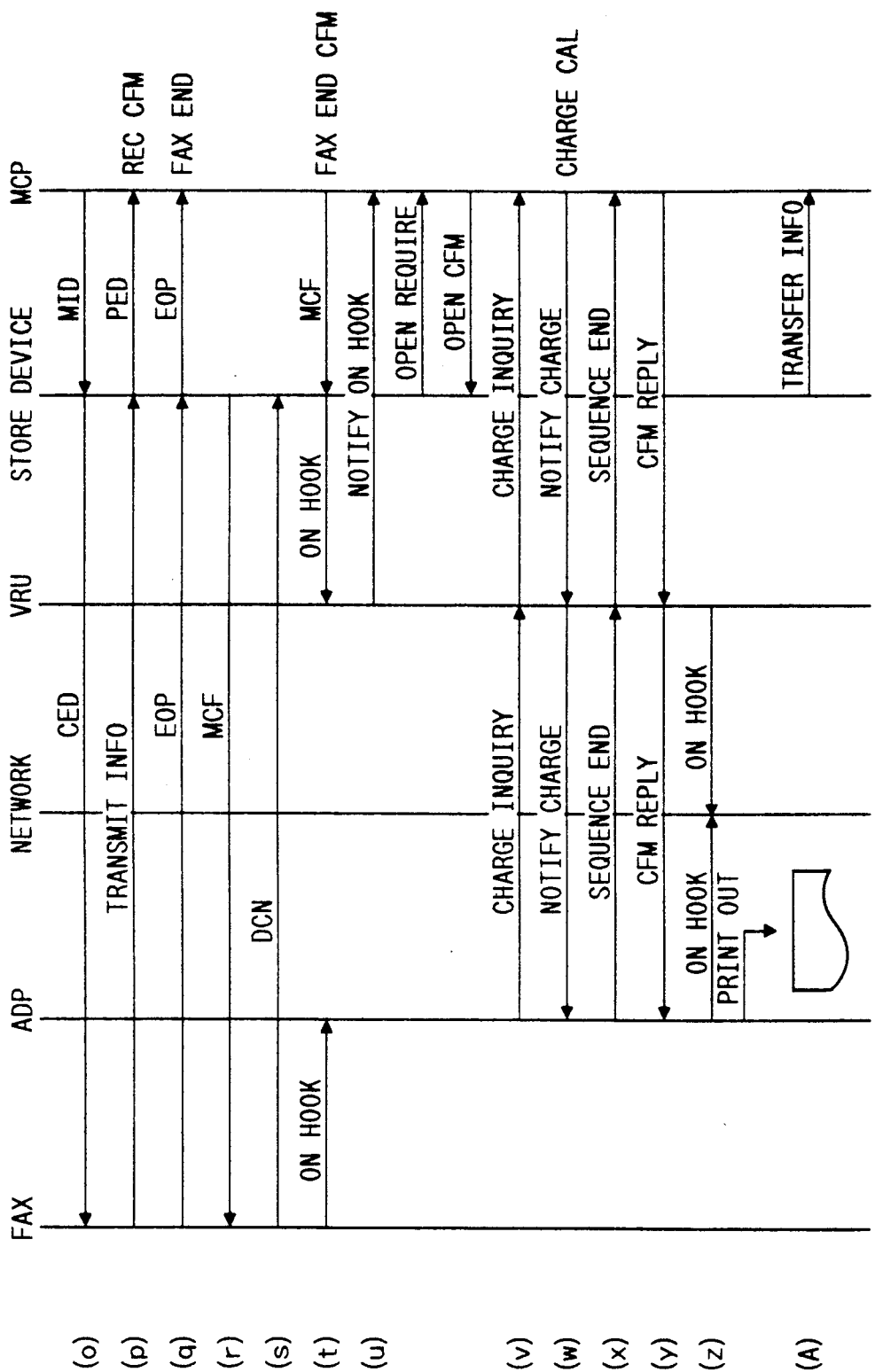

Operation of the embodiment of this invention will be further described with reference to FIG. 6-FIG. 9. FIG. 6A and FIG. 6B show a communication sequence for registering a message from the FAX 7. With reference to FIG. 6A, at a stage (a), a paper with a message is set and a telephone receiver is hooked off in the FAX 7. Then, the FAX 7 and the ADP 6 are connected, and the FAX 7 is connected to the telephone network 5 via the ADP 6. At a stage (b), a signal representative of a dial tone (DT) of 400 Hz is returned from the telephone network 5. When a message registering button is depressed in the FAX 7 at a subsequent stage (c), the ADP 6 communicates with the VRU 3 via the telephone network 5 for a registration requirement and the VRU 3 notifies the MCP 1 of a call incoming. The MCP 1 accepts the call incoming at a stage (d), and a signal representative of a call incoming acceptance is transmitted to the ADP 6 via the VRU 3. The ADP 6 transmits the identification (ID) code of the source FAX 7 to the MCP 1 via the VRU 3 at a stage (e), and the MCP 1 checks the ID code and notifies the ADP 6 of a communication possibility via the VRU 3 at a stage (f). When the communication possibility is issued, the VRU 3 requires a message board NO. to be inputted by using a voice guidance at a stage (g). In the FAX 7, a mail box number (a message board NO.) is inputted via ten keys at a stage (h). When the VRU 3 transmits a signal of the mail box number to the MCP 1, the MCP 1 checks the mail box number at a stage (i). If the mail box number is good, the MCP 1 outputs an instruction of check OK to the VRU 3. In response to this instruction, the VRU 3 requires the FAX 7 to check the box number by using a voice. If the box number is good, an answer representing that the box number is good is inputted via the ten keys in the FAX 7 at a stage (j). The VRU 3 notifies the MCP 1 of this answer. The MCP 1 transmits a signal of registration OK to the VRU 3 at a stage (k), and the VRU 3 communicates with the store device 2 at a stage (l) and the store device 2 informs the MCP 1 that an operation preparation is good. In response to this information, the MCP 1 permits the communication between the FAX 7 and the store device 2 at a stage (m). Thus, the store device 2 establishes the connection with the VRU 3. The VRU 3 informs the FAX 7 of a registration start by a signal of a voice. At a stage (n), the VRU 3 informs the MCP 1 that the store device 2 and the FAX 7 have been connected. With reference to FIG. 6B, the MCP 1 gives a permission of picture reception (MID) to the store device 2 at a stage (o), and the store device 2 outputs a called-terminal identification signal (CED) to the FAX 7. Thereby, the FAX 7 transmits picture information (a message) to the store device 2 at a stage (p), and the store device 2 outputs a page signal (PED) to the MCP 1 so that the MCP 1 confirms the reception. When the transmission of the picture information is completed, a sequence end signal (EOP) is transmitted from the FAX 7 to the MCP 1 via the store device 2 at a stage (q). At a next stage (r), the store device 2 transmits a message confirmation signal (MCF) to the FAX 7. At a stage (s), the FAX 7 transmits a disconnection instruction signal to the store device 2. At a stage (t), the FAX 7 is disconnected from the ADP 6, and the MCP 1 outputs a communication end confirmation signal (MCF) the store device 2 so that the store device 2 is disconnected from the VRU 3. At a stage (u), the VRU 3 notifies the MCP 1 of the disconnection from the store device 2. At a next stage (v), the ADP 6 inquires a communication charge of the MCP 1 via the VRU 3. At a stage (w), the MCP 1 calculates a charge and notifies the ADP 6 of the calculated charge via the VRU 3. At stages (x) and (y), a notification of a sequence end, and a related confirmation are done. At a stage (z), the ADP 6 and the VRU 3 are disconnected from the telephone network 5, and the ADP 6 prints out a statement of charge accounts. At a next stage (A), the picture information is transmitted from the store device 2 to the MCP 1, being stored and managed in the MCP 1.

FIG. 7 shows a part of a sequence of reading out a registered message which is different from the corresponding part of the sequence of FIGS. 6A and 6B. With reference to FIG. 7, at a stage (a), the FAX 7 transmits an answer of mail box number confirmation OK to the MCP 1 via the VRU 3. At a stage (b), the MCP 1 transmits a signal of registered-information readout OK to the VRU 3. At a stage (c), the MCP 1 transmits required information (message) to the store device 2. During this period, the VRU 3 transmits a guidance of being in preparation to the FAX 7, and continues to transmit a corresponding music. When the readout preparation is completed, MCP 1 notifies the VRU 3 of this information at a stage (d). The VRU 3 informs the FAX 7, by a signal of a voice, that a start button should be depressed and a telephone receiver should be hooked on. At a stage (e), the store device 2 transmits the picture information to the FAX 7. Finally, at a stage (f), MCP 1 outputs an instruction of erasing the transmitted picture information to the store device 2.

Figure 8A:
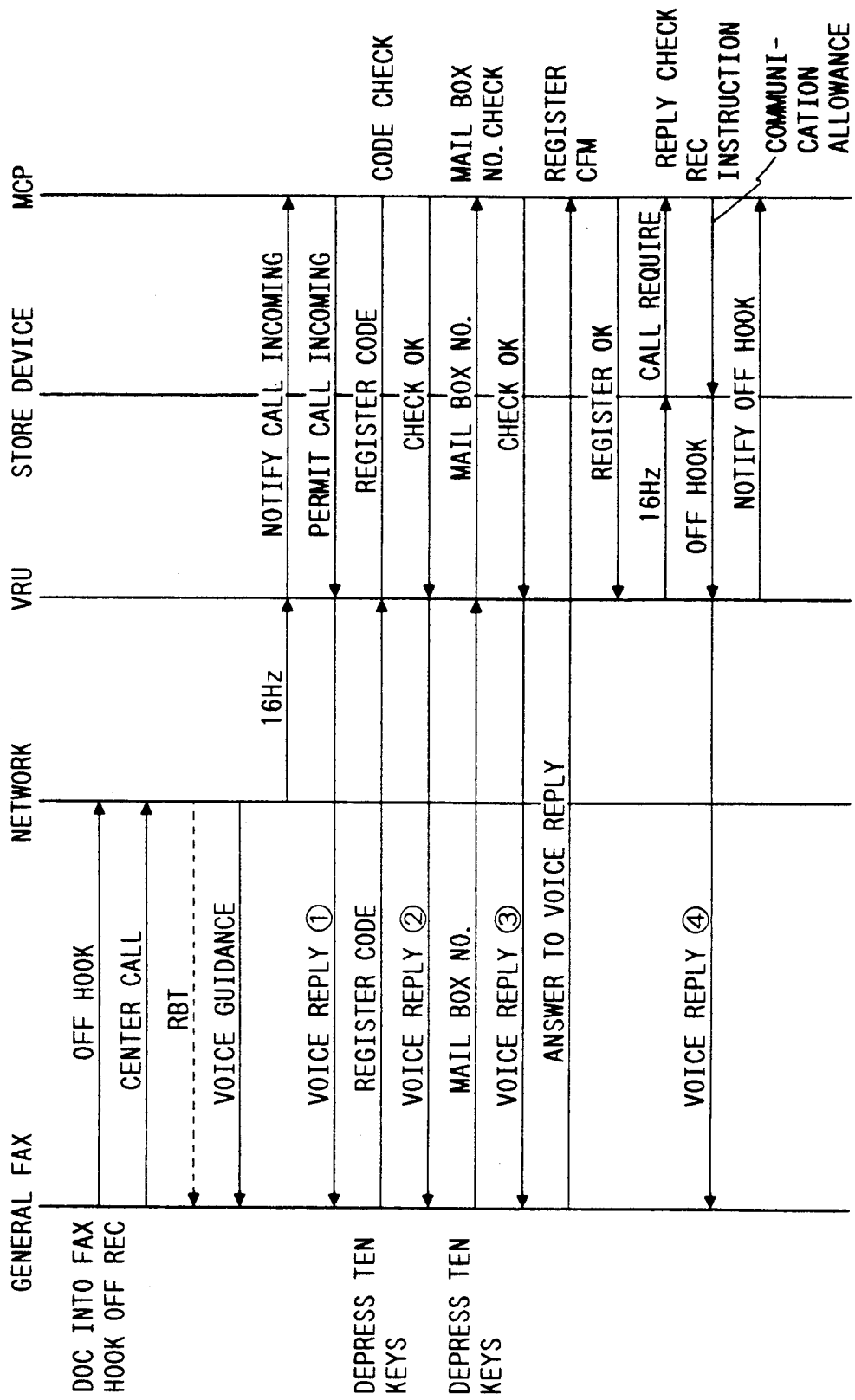

FIG. 8A and FIG. 8B show a communication sequence for registering picture information into the store device 2 from the general FAX 8. Since the general FAX 8 lacks an ADP 6, the general FAX 8 communicates with the telephone network 5 and the VRU 3. Other parts of the communication sequence are approximately similar to the corresponding parts of the communication sequence of FIGS. 6A and 6B. In FIG. 8A, RBT denotes a ring back tone corresponding to a call signal of 400 Hz.

Figure 9:
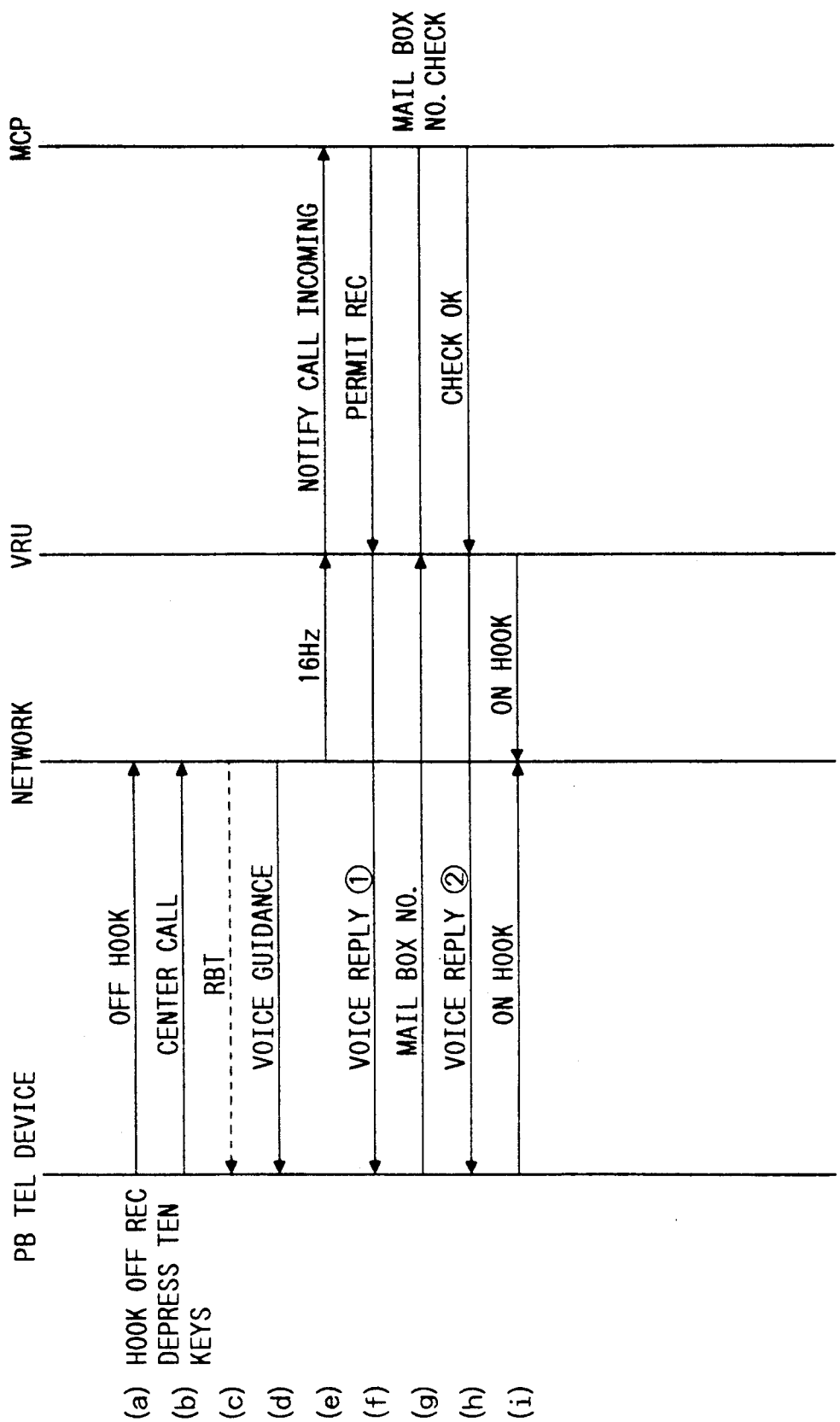
FIG. 9 is a diagram showing a communication sequence which occurs in the case where an inquiry regarding whether or not information is registered is done via a PB telephone device.

FIG. 9 shows a sequence for inquiring registered picture information from the PB telephone device 9. With reference to FIG. 9, at a stage (a), a telephone receiver is hooked off in the PB telephone device 9. Ten keys are depressed in the PB telephone device 9 at a stage (b), and then a BRT signal is transmitted from the telephone network 5 at a stage (c). At a subsequent stage (d), a voice guidance announcing that this service requires a charge is transmitted from the public telephone network. At a next stage (e), the telephone network 5 outputs a signal of 16 Hz to the VRU 3. The VRU 3 notifies the MCP 1 of a call incoming. When a permission of reception is issued from the MCP 1 at a stage (f), the VRU 3 gives a voice guidance of mail box number transmission. At a stage (g), the PB telephone device 9 notifies the MCP 1 of a mail box number via the VRU 3. The MCP 1 checks the mail box number. If the mail box number is good, the MCP 1 gives a voice guidance representing that picture information of the mail box number is registered, and representing the due data of the readout of the registered picture information. At a stage (i), the communication is ended.

Modifications of the embodiment of this invention will be described with reference to FIG. 10 and FIG. 11.

Figure 10:
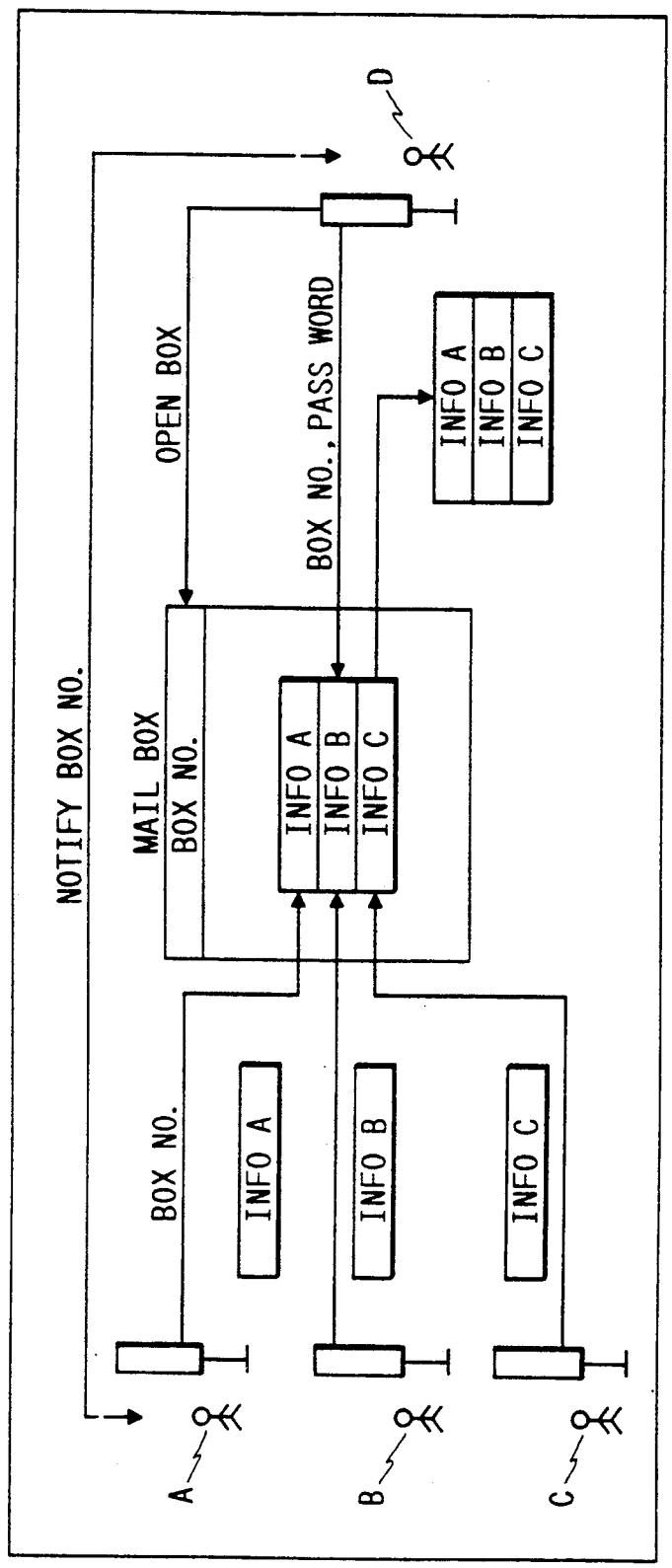
FIG. 10 is a diagram of a mail box in a modification of the embodiment of this invention.

FIG. 10 shows a modification of the embodiment of this invention which relates to a mail box. To become the owner of a mail box, a mail box number effective for a predetermined period is registered and a pass word is received. Information can be registered into the mail box by using the mail box number as a key. In FIG. 10, A, B, and C denote registration persons. An information readout person D reads out the information by using the mail box number and the pass word. In this case, the registration persons and also the information readout person must pay charges.

FIG. 11 shows another modification of the embodiment of this invention which relates to a notice board. To register information into a notice board, a registration person registers a notice board number and receives a pass word. During the registration of the information, the registration person uses the notice board number and the pass word as a key. An information readout person reads out the information by using the notice board number. In FIG. 11, A denotes a registration person while B, C, and D denote information readout persons. In this case, the registration person and also the information readout persons must pay charges.

What is claimed is:

1. A facsimile communication system comprising:
   a facsimile terminal;
   a store device;
   a telephone network connecting the facsimile terminal and the store device;
   a terminal adaptor connected between the facsimile terminal and the telephone network;
   a voice response unit connected between the telephone network and the store device; and
   a control device connected to the voice response unit and the store device;
   the terminal adaptor including means for enabling the facsimile terminal to gain access to the telephone network and the voice response unit, means for inquiring a communication charge on the facsimile terminal of the control device, and means for recording an answer to said inquiring;
   the voice response unit including means for mediating a communication among the facsimile terminal, the terminal adaptor, the store device, and the control device, means for transmitting an instruction from the control device to the facsimile terminal as a voice response, means for connecting a line between the facsimile terminal and the store device when an answer of the facsimile terminal to the voice response satisfies a predetermined condition, and means for breaking the connection between the facsimile terminal and the store device after a facsimile communication is completed;

the store device including means for storing information transmitted from at least one of the facsimile terminal and the control device;

the control device including means for storing and managing the information stored in the store device on the basis of a number specified with respect to the information, means for transmitting the stored information to the store device in compliance with a requirement for reading out the information which is outputted from the facsimile terminal, means for calculating the communication charge, and means for controlling a communication with the store device and the voice response unit.

2. The facsimile communication system of claim 1 further comprising a general facsimile terminal, a second store device connected to the general facsimile terminal via the telephone network and storing information transmitted from at least one of the general facsimile terminal and the control device, a second voice response unit connected between the second store device and the telephone network, the second store device being connected to the control device, the second voice response unit being connected to the control device, the second voice response unit including means for mediating a communication among the general facsimile terminal, the second store device, and the control device, means for transmitting an instruction from the control device to the general facsimile terminal as a voice response, means for connecting a line between the general facsimile terminal and the second store device when an answer of the general facsimile terminal to the voice response satisfies a predetermined condition, and means for breaking the connection between the general facsimile terminal and the second store device after a facsimile communication is completed, means for enabling the general facsimile terminal and the facsimile terminal to transmit information therebetween, and means for enabling a communication charge of the general facsimile terminal to be required from a working organ of the telephone network.

3. The facsimile communication system of claim 1 further comprising a push-button-type telephone device, and another voice response unit connected to the telephone device via the telephone network, the another voice response unit being connected to the control device, the voice response unit including means for mediating a communication between the telephone device and the control device, and means for transmitting an instruction from the control device to the telephone device as a voice response, and means for enabling an inquiry regarding whether or not information having a specific number is stored to be done via the telephone device.

4. The facsimile communication system of claim 1, 2, or 3 wherein the terminal adaptor includes means for indicating and printing out the communication charge in a bar-code notation.

5. The facsimile communication system of claim 1, 2, or 3 wherein the terminal adaptor includes means for collecting communication data containing the communication charge for each communication.

6. The facsimile communication system of claim 5 wherein the terminal adaptor includes means for collecting the communication data for a predetermined period, and recording and outputting the collected communication data.

7. The facsimile communication system of claim 5 wherein the terminal adaptor includes means for collecting the communication data for a predetermined period, and transmitting the collected communication data to the control device.

8. The facsimile communication system of claim 1, 2, or 3 wherein the terminal adaptor includes means for, in cases where a communication error occurs in a communication system, recording and outputting contents of the communication error.

9. The facsimile communication system of claim 1, 2, or 3 wherein the terminal adaptor includes means for, in cases where a power supply is interrupted and in cases where recording papers are exhausted, disconnecting the facsimile terminal and the telephone network from each other.

10. The facsimile communication system of claim 1, 2, or 3 wherein the voice response unit includes means for recognizing a PB tone from the terminal adaptor, means for converting the PB tone into ASCII codes and transmitting the ASCII codes to the control device, means for recognizing ASCII code data from the control device, means for converting the ASCII code data into a PB tone and transmitting the PB tone to the terminal adaptor.

11. The facsimile communication system of claim 1, 2, or 3 wherein the voice response unit includes means for, after a transmission of a voice response, monitoring an interval of each segment of a PB tone transmitted from the terminal adaptor by referring to a fixed timer value, and means for, in cases where a next PB tone fails to be detected in this timer value, transmitting an error signal to the control device.

12. The facsimile communication system of claim 1, wherein said voice response unit includes means for transmitting a predetermined voice response to one of the facsimile terminal and a push-button-type telephone device when a communication with the control device fails due to a malfunction.

13. The facsimile communication system of claim 1, wherein the voice response unit includes means for, in cases where a normal process allowable state with one of the control device, and the terminal adaptor is absent, transmitting a predetermined voice to the facsimile terminal in compliance with an instruction from the control device.

14. The facsimile communication system of claim 1, wherein the voice response unit includes means for providing a music response as the voice response.

15. The facsimile communication system of claim 1 or 3, wherein the store device includes means for storing information and an identification number inputted from the facsimile terminal, means for transmitting the information and the identification number to the control device and registering the information and the identification number into the control device, and means for, in cases where the facsimile terminal requires a readout of the registered information on the basis of the identification number, transferring the stored information to the control device and transmitting the information to the facsimile terminal which requires the readout.

16. The facsimile communication system of claim 1 or 3, wherein the terminal adaptor includes means for, in cases where the facsimile terminal outputs a requirement of a direct communication with another facsimile terminal, connecting the facsimile terminal to the telephone network, monitoring a communication, calculating a charge, and outputting a record.

17. The facsimile communication system of claim 2, wherein each of the voice response unit and the second voice response unit includes means for transmitting a predetermined voice response to one of the facsimile terminal, the general facsimile terminal, and the push-button-type telephone device when a communication with the control device fails due to a malfunction.

18. The facsimile communication system of claim 2, wherein the terminal adaptor includes means for, in cases where the facsimile terminal outputs a requirement of a direct communication with one of another facsimile terminal and the general facsimile terminal, connecting the facsimile terminal to the telephone network, monitoring a communication, calculating a charge, and outputting a record.

19. The facsimile communication system of claim 2, wherein each of the store device and the second store device includes means for storing information and an identification number inputted from at least one of the facsimile terminal and the general facsimile terminal, means for transmitting the information and the identification number to the control device and registering the information and the identification number into the control device, and means for, in cases where at least one of the facsimile terminal and the general facsimile terminal requires a readout of the registered information on the basis of the identification number, transferring the stored information to the control device and transmitting the information to one of the facsimile terminal and the general facsimile terminal which requires the readout.

20. The facsimile communication system of claim 2 further comprising a push-button-type telephone device, and a third voice response unit connected to the telephone device via the telephone network, the third voice response unit being connected to the control device, the voice response unit including means for mediating a communication between the telephone device and the control device, and means for transmitting an instruction from the control device to the telephone device as a voice response, and means for enabling an inquiry regarding whether or not information having a specific number is stored to be done via the telephone device.

21. The facsimile communication system of claim 20 wherein each of the voice response unit, the second voice response unit, and the third voice response unit includes means for transmitting a predetermined voice response to one of the facsimile terminal, the general facsimile terminal, and the push-button-type telephone device when a communication with the control device fails due to a malfunction.

22. The facsimile communication system of claim 2 or 20 wherein each of the voice response unit and the second voice response unit includes means for, in cases where a normal process allowable state with one of the control device, the terminal adaptor, and the general facsimile terminal is absent, transmitting a predetermined voice to one of the facsimile terminal and the general facsimile terminal in compliance with an instruction from the control device.

23. The facsimile communication system of claim 2 or 20 wherein each of the voice response unit and the second voice response unit includes means for providing a music response as the voice response.

24. A facsimile communication system comprising:
a facsimile terminal;
a picture store control device;
a telephone network connecting the facsimile terminal and the picture store control device; and
a terminal adaptor connected between the facsimile terminal and the telephone network;
the terminal adaptor including means for enabling the facsimile terminal to gain access to the telephone network and the picture store control device, means for inquiring a communication charge on the facsimile terminal of the picture store control device, and means for obtaining an answer to said inquiring and indicating the communication charge;
the picture store control device including means for outputting the stored information in compliance with a requirement for reading out the information which is transmitted from the facsimile terminal, means for giving a voice guidance to the facsimile terminal necessary in the process, and means for calculating the communication charge in compliance with a requirement from the terminal adaptor.

* * * * *

UNITED STATES PATENT AND TRADEMARK OFFICE
CERTIFICATE OF CORRECTION

PATENT NO. : 5,265,153
DATED : November 23, 1993
INVENTOR(S) : Masatoshi OZAWA

It is certified that error appears in the above-indentified patent and that said Letters Patent is hereby corrected as shown below:

On the title page, please delete the Assignee information and insert the following therefor:

--[73]    Assignee: Matsushita Graphic Communication Systems, Inc., Japan--

Signed and Sealed this

Seventh Day of June, 1994

*Attest:*

BRUCE LEHMAN

*Attesting Officer*         Commissioner of Patents and Trademarks